Patented Dec. 22, 1925.

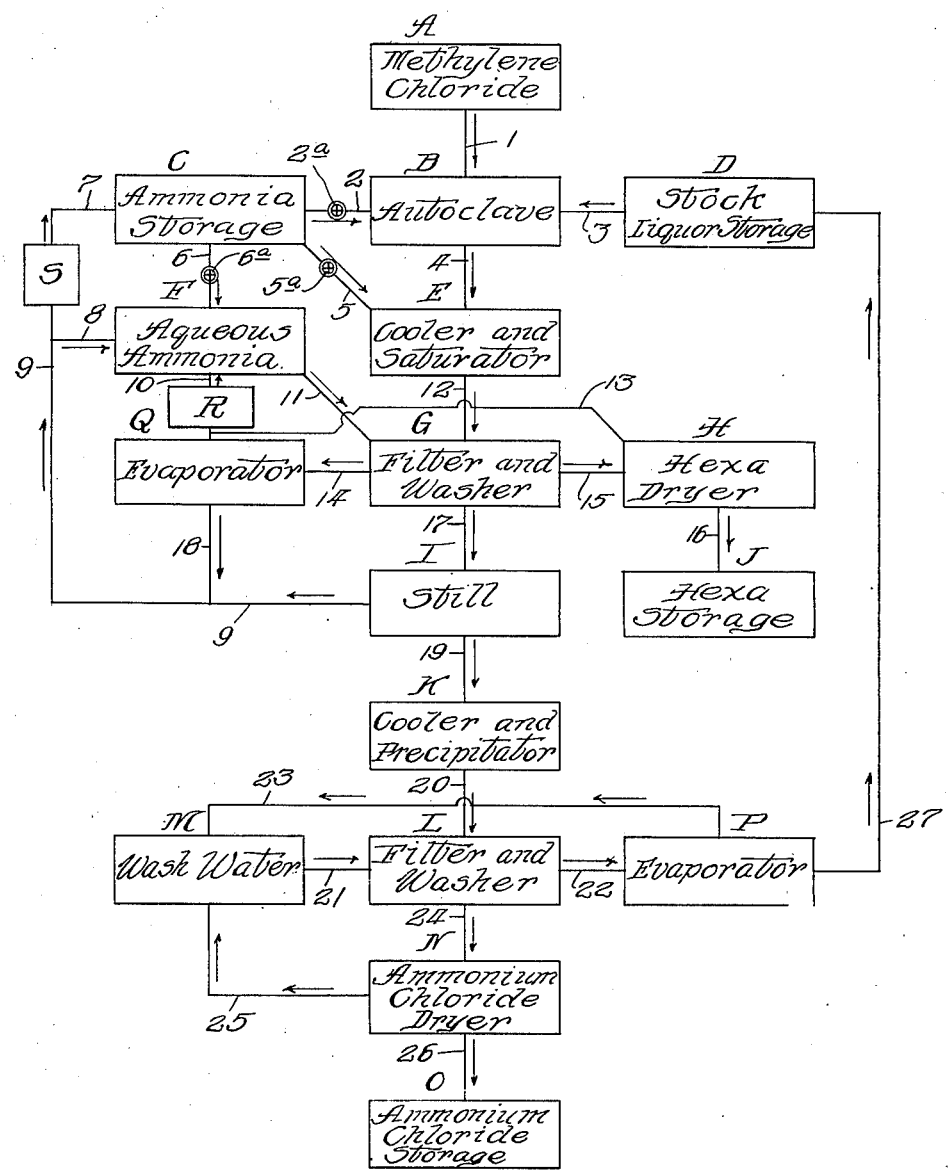

1,566,822

UNITED STATES PATENT OFFICE.

CARNIE B. CARTER, OF PITTSBURGH, PENNSYLVANIA, ASSIGNOR TO S. KARPEN & BROS., OF CHICAGO, ILLINOIS, A CORPORATION OF WEST VIRGINIA.

PRODUCTION OF HEXAMETHYLENETETRAMINE AND AMMONIUM CHLORIDE.

Application filed July 26, 1924. Serial No. 728,464.

*To all whom it may concern:*

Be it known that I, CARNIE B. CARTER, a citizen of the United States, residing at Pittsburgh, in the county of Allegheny and State of Pennsylvania, have invented a new and useful Improvement in the Production of Hexamethylenetetramine and Ammonium Chloride, of which the following is a specification.

This invention relates particularly to a method of producing hexamethylenetetramine and ammonium chloride.

The primary object is to provide a process for enabling hexamethylenetetramine to be produced in substantially pure form at very moderate cost. According to this method, the use of expensive solvents is avoided, and the necessity for evaporation of water is reduced to a minimum.

Methylene chloride reacts with ammonia to form hexamethylenetetramine and ammonium chloride in accordance with the following equation:

$$6CH_2Cl_2 + 16NH_3 = (CH_2)_6N_4 + 12NH_4Cl.$$

The reaction may be carried out in practice, as has been pointed out in earlier applications, either in aqueous or liquid ammonia solution.

When the reaction is carried out in liquid ammonia the recovery of hexamethylenetetramine from the reaction product offers no particular difficulty; it is a comparatively simple matter to separate the hexamethylenetetramine from the ammonium chloride by extraction with chloroform or other suitable solvent. Such solvents, however, are expensive and recovery accordingly is expensive.

When the reaction is carried out in aqueous ammonia solution the hexamethylenetetramine and ammonium chloride are obtained in aqueous solution from which hexamethylenetetramine and ammonium chloride cannot be obtained in a mechanically mixed form by simple evaporation of the water. The difficulty here is that secondary reactions take place during the evaporation which result in the loss of a part of the hexamethylenetetramine, as formaldehyde and ammonia and which also result in the formation of considerable amounts of hexamethylenetetramine hydrochloride. The residual salt mixture recovered by such evaporation when extracted with chloroform or other suitable solvents does not yield the full theoretical amount of hexamethylenetetramine, and under some conditions may give only a small proportion of the theoretical yield. It is essential, therefore, that the evaporation of such solution shall be performed under such conditions that free ammonia shall be present in the solution and salt mixture at all times during the evaporation and drying. If these precautionary measures are taken complete recovery of hexamethylenetetramine from the residual salts may be made. In whatever manner the hexamethylenetetramine is produced, however, the problem of effecting separation in an inexpensive manner is important.

In my pending application No. 691,673, filed in the United States Patent Office, February 9, 1924, is described a process by which hexamethylenetetramine may be produced very advantageously by a reaction between methylene chloride and aqueous ammonia, the reaction being greatly facilitated by the use of a large excess of ammonia. However, it is now evident that, from a practical standpoint, one of the chief difficulties to be overcome in the manufacture of hexamethylenetetramine from methylene chloride, using aqueous ammonia solutions, is that of recovering the hexamethylenetetramine from the reaction liquor. In the present invention, advantage is taken of an increased solvent effect of aqueous solutions for ammonium chloride and a decreased solvent effect of such solutions for hexamethylenetetramine by introducing into, or surcharging, the solution with ammonia gas. The ammonia gas can be distilled off and recovered at small expense. By the improved method, it is possible to avoid the use of expensive solvents and to lower the evaporating costs greatly.

The solvent power of water for hexamethylenetetramine is greatly reduced by saturating the solution with ammonia. Hexamethylenetetramine is soluble to the extent of about 90 grams per 100 cc. of water, in the absence of ammonia, but the solvent power is reduced to 10 or 15% of this amount if the water be surcharged with ammonia. It is possible to precipitate as much as 90% of hexamethylenetetramine from a saturated solution by introducing ammonia gas into the solution. In liquid ammonia, the hexamethylenetetramine concentration becomes almost negligible; and in an aqueous solution of hexamethylenetetramine completely saturated with ammonia, the hexamethylenetetramine concentration is very low, indeed.

On the other hand, the introduction of ammonia into an aqueous solution of ammonium chloride greatly increases the solubility for ammonium chloride. Water dissolves about 39 grams of ammonium chloride per 100 cc. at ordinary temperatures and about 77 grams per 100 cc. at 90° C. The introduction of ammonia into the solution increases the solvent power of water with increasing ammonia concentration, and 100 cc. of water at ordinary temperatures carrying 21.8 grams of ammonia per 100 cc. of solution will dissolve 63.5 grams of ammonium chloride. Liquid ammonia will dissolve still more ammonium chloride than will an aqueous solution saturated with ammonia. There is, of course, an expansion of the aqueous solution during the introduction of ammonia, so that the amount of either hexamethylenetetramine or ammonium chloride which will be held in solution per 100 cc. of the solution itself is less than when expressed in terms of the original 100 cc. of water.

The solvent power of aqueous ammonia solutions for hexamethylenetetramine and ammonium chloride, each, is not appreciably affected by the presence of both these substances in the same solution. In the following table, the solubilities of hexamethylenetetramine and ammonium chloride in aqueous ammonia solutions are expressed in grams of 100 cc. of solution, and also per 100 cc. of water.

*Solubilities.*

| Per 100 cc. of solution. | | | Per 100 cc. of water. | | |
|---|---|---|---|---|---|
| $NH_3$ | Hexa. | $NH_4Cl$ | $NH_3$ | Hexa. | $NH_4Cl$ |
| 0.0 | 47.5 | 20.2 | 0.0 | 90.5 | 38.6 |
| 5.3 | 33.6 | 21.2 | 10.6 | 67.5 | 42.4 |
| 8.1 | 29.7 | 21.9 | 15.5 | 60.5 | 44.6 |
| 13.8 | 21.1 | 24.7 | 30.8 | 47.1 | 55.2 |
| 28.4 | 4.2 | 24.2 | 76.9 | 11.2 | 65.5 |

It is very clear that there is a very marked decrease in the solubility of hexamethylenetetramine with rising ammonia concentration and, at the same time, a marked increase in the solubility of ammonium chloride in the same solution. In fact, the solubility of hexamethylenetetramine is reduced about 87.6%, and the solubility of ammonium chloride is increased to about 170% of its former value.

Saturation of the solutions shown in the foregoing experiments was carried out at somewhat lowered temperatures. It is to be noted, however, that the same effects can be secured at higher temperatures if the ammonia is introduced into the solution under pressure.

In my application No. 728,463 filed in the United States Patent Office on even date herewith, it is pointed out how these phenomena can be employed in a practical way in the recovery of hexamethylenetetramine from mixtures containing ammonium chloride. Such mixtures may be composed of the dry salts obtainable, for example, by producing hexamethylenetetramine by a reaction between liquid ammonia and methylene chloride, in which reaction ammonium chloride is formed as a by-product; or the mixture may be composed of the wet salts, such as may be obtained from a reaction between methylene chloride and aqueous ammonia, followed by evaporation of most of the liquor, under suitable conditions. According to the present invention, these same phenomena are taken advantage of in effecting separation of these salts from solutions in which the salts are formed by reacting upon methylene chloride with ammonia in aqueous solution, the ammonia being preferably used in large excess above the theoretical amount required for the reaction.

In accordance with the present process, as preferably practiced, an aqueous solvent, which may be termed a stock liquor, is charged into an autoclave, which also receives a charge of methylene chloride and ammonia sufficient to combine with the methylene chloride and also to provide an excess of several hundred percent above the theoretical amount necessary for the reaction, such excess serving to facilitate and expedite the reaction and enable the process to be carried out within a reasonably short period and at pressures which are not excessive; the autoclave is heated at a suitable temperature, say 100° C., or less, until the reaction is complete; the liquor is then passed to a saturator and surcharged with ammonia gas, the device being suitably cooled; the contents of the saturator composed largely of a solution of ammonium chloride and some hexamethylenetetramine saturated with ammonia, and also of the precipitated hexamethylenetetramine, are passed to a filter, where the precipitated hexamethylenetetramine is separated from the liquor, the liquor then being passed to a still and the hexamethylenetetramine being washed and passed to a dryer; the ammonia is distilled off and returned to the ammonia storage tank; the liquor is discharged into a cooler and precipitator, where much of the ammonium chloride is precipitated; the material is then passed to a filter where the liquor is separated from the precipitated ammonium chloride; the ammonium chloride is then washed on the filter, and passed to a dryer; the filtrate is passed to an evaporator where a portion of the water (corresponding with the wash-water) is evaporated and returned to the wash-water source of supply; and the stock liquor, consisting of a solution of ammonium chloride and a small percentage of dissolved hexamethylenetetramine is returned to the stock liquor storage-tank from which the autoclave draws its supply. Thus, the ammonia employed in the process is reused, and the stock liquor is reused, ammonia being used in sufficient amount in the process to suitably increase the solvent power of the liquor for ammonium chloride and reduce the solvent power of hexamethylenetetramine, so that the hexamethylenetetramine can be thrown out at one point in the system, the ammonia can be distilled and returned to the source of supply, and the liquor thus placed in condition to deposit, at a separate point in the system, a large portion of the ammonium chloride, the precipitation here obtained resulting both from the removal of the ammonia from the liquor and the cooling of the liquor.

The accompanying drawing illustrates, diagrammatically, a system and apparatus which may be advantageously employed in the practice of the process. The process will be further described with reference to said drawing.

A represents a storage-tank for methylene chloride; B, an autoclave; C, a storage-tank for ammonia which may be liquid ammonia; D, a stock liquor storage-tank; E, a cooler and saturator which receives the solution from the autoclave after the reaction between the methylene chloride and ammonia has been effected, and which receives also ammonia in large enough quantity to effect precipitation of the bulk of the hexamethylenetetramine contained in the solution, the reduction in temperature adding also, in some degree, in effecting precipitation of hexamethylenetetramine; F, a storage tank for aqueous ammonia; G, a filter and washer where the precipitated hexamethylenetetramine is separated from the liquor, the liquor passing then to a still and the hexamethylenetetramine being washed on the filter, the wash-water passing to an evaporator; H, a dryer for hexamethylenetetramine; I, a still which receives the mother-liquor from the device G, which device may be either an ordinary filter or a centrifuging machine; J, a storage chamber for hexamethylenetetramine; K, a cooler and precipitator which receives the contents from the still I after the ammonia has been distilled off, a large portion of the ammonium chloride being thus precipitated in the still as the result of evaporation of ammonia and additional ammonium chloride being precipitated in the vessel K as a result of cooling the liquor; L, a filter and washer where the precipitated ammonium chloride is separated from the liquor, the liquor being withdrawn to an evaporator and the precipitate being subjected to a washing operation on the filter, which may be an ordinary filter or a centrifuging machine; M, a tank containing wash-water which is free from ammonia; N, a dryer for the ammonium chloride; O, a storage chamber for the ammonium chloride; P, an evaporator which receives the liquor from the filter L; Q, an evaporator which receives the wash-water from the filter G; R, a condenser for ammonia employed in the system; and S, a condenser for ammonia employed in the system.

Lines of communication, or routings, between the various vessels and chambers are designated 1 to 27 inclusive, the course of materials being indicated by the arrows. The lines 2, 5 and 6 leading from the liquid ammonia tank C are preferable equipped with reducing valves $2^a$, $5^a$ and $6^a$, respectively.

The storage-tank D may originally contain pure water, if desired. However, when the process is operating normally, it will contain water having in solution a considerable quantity of ammonium chloride and a comparatively small amount of hexamethylenetetramine. In the practice of the process, stock liquor is passed from the tank D into the autoclave; and methylene choride and ammonia are introduced into the autoclave, the ammonia being taken in sufficient amount to combine with the methylene chloride and form hexamethylenetetramine and ammonium chloride. To facilitate the reaction, the ammonia is preferably used in excess to an extent of 300 to 400% of the theoretical proportions, and this will tend to effect precipitation of hexamethylenetetramine as it is formed in the autoclave, and will, at the same time, tend to increase the solvent power of the liquor for ammonium chloride. After the reaction is complete, the contents of the autoclave are discharged into the cooler and saturator E and the liquor is then surcharged with ammonia, or, in any event, the ammonia is used in sufficient amount to cause the precipitation of a large portion of the hexamethylenetetramine contained in solution and, at the same time, to insure that all of the ammonium chloride shall be in solution. The contents of the device E are then passed to the filter G, where the hexamethylenetetramine is separate from the liquor and the liquor is discharged into the still I. The hexamethylenetetramine is washed on the filter with aqueous ammonia, which tends to precipitate hexamethylenetetramine, the wash-water is passed to the evaporation Q, where the ammonia may be distilled off, and where, if any excess water is introduced into the system, it may be evaporated off to maintain the proper balance. At the still I, the ammonia is distilled off and returned by the lines 9 and 7 to the ammonia storage-tank C, a condenser being interposed in the line 7. The remaining contents of the still I are evacuated into the cooler and precipitator K. It will be noted that precipitation of a large portion of the ammonium chloride will result from the expulsion of the ammonia and the cooling of the liquor. The contents of the vessel K are then passed to the filter L where the precipitated ammonium chloride is separated and passed to the dryer N. The filtrate and wash-water from the filter L are passed to the evaporator P, where a partial evaporation is effected (corresponding with wash-water used), and the mother-liquor, composed of water containing a considerable amount of ammonium chloride and a small amount of hexamethylenetetramine in solution is returned to the storage-tank D. Pure water is employed for washing the ammonium chloride at the filter L, no ammonia being employed at this point for the reason that it is desired to precipitate a large proportion of the ammonium chloride. Water evaporated from the dryer N passes to the wash-water tank M.

It will be noted from the description given that the separation of hexamethylenetetramine from ammonium chloride is effected without the necessity of evaporation of the solution, followed by the use of an expensive solvent for extracting the ammonium chloride from the hexamethylenetetramine. In the present method, the ammonia can be distilled from the liquor at a small expense, and the evaporation of water necessary corresponds merely with that required for drying the salts and evaporating the wash-water employed at the filter L.

If the ammonium chloride produced is to be employed as a source for ammonia, the operation of drying this by-product may be omitted, and the product may be taken in wet condition, directly to the ammonia recovery plant.

The foregoing description has been given for clearness of understanding only, and no unnecessary limitations should be understood therefrom, but the appended claims should be construed as broadly as permissible, in view of the prior art.

What I regard as new, and desire to secure by Letters Patent, is:

1. The process of producing and separating hexamethylenetetramine and ammonium chloride which comprises: heating methylene chloride and aqueous ammonia and employing excess ammonia to lower the solvent power of the liquor for hexamethyletetramine and increase the same for ammonium chloride, separating the precipitated hexamethylenetetramine from the liquor, and distilling ammonia from the liquor and cooling the liquor and thus precipitating ammonium chloride and separating the precipitated ammonium chloride from the liquor.

2. The process which comprises: causing a reaction between methylene chloride and ammonia in an aqueous solvent containing ammonium chloride and hexamethylenetetramine in solution and containing also ammonia in greater than the theoretical proportion, treating the resultant solution with additional ammonia to lower the solvent power for hexamethylenetetramine and cause precipitation of hexamethylenetetramine, separating the precipitated hexamethylenetetramine from the liquor, distilling off the ammonia to lower the solvent power of the liquor for ammonium chloride, cooling the remaining liquor, and separating the precipitated ammonium chloride from the liquor.

3. The process which comprises: causing a reaction between methylene chloride and ammonia in an aqueous solvent containing ammonium chloride and hexamethylenetetramine in solution, the ammonia being employed in the solution in greater than the theoretical proportion, treating the solution with additional ammonia to lower the solvent power for hexamethylenetetramine and cause precipitation of hexamethylenetetramine, separating the precipitated hexamethylenetetramine from the liquor, distilling off the ammonia from the liquor and returning the ammonia for reuse, cooling the remaining liquor and precipitating a large portion of the ammonium chloride, separating the precipitated ammonium chloride from the liquor, and returning the liquor for reuse in the solvent.

4. The process which comprises: heating methylene chloride and an aqueous solution of ammonium chloride and hexamethylenetetramine, charged with ammonia in excess of the theoretical amount required to combine with the methylene chloride, charging the resultant solution strongly with ammonia and thus precipitating a large portion of the hexamethylenetetramine, separating the precipitated hexamethylenetetramine from the liquor, distilling ammonia from the liquor to lower the solvent power for ammonium chloride, cooling the liquor, and separating the precipitated ammonium chloride from the liquor.

5. The process which comprises: heating methylene chloride and an aqueous solution of ammonium chloride and hexamethylenetetramine, charged with ammonia in excess of the theoretical amount required to combine with the methylene chloride, charging the resultant solution strongly with ammonia and thus precipitating a large portion of the hexamethylenetetramine, separating the precipitated hexamethylenetetramine from the liquor, distilling ammonia from the liquor, returning the ammonia to the source of supply, cooling the liquor, separating the precipitated ammonium chloride from the liquor, and employing the liquor as a stock solution in which to carry out the reaction between methylene chloride and ammonia.

6. The continuous process of making hexamethylenetetramine and ammonium chloride which comprises: heating in an autoclave methylene chloride and water containing ammonium chloride in solution, in the presence of ammonia employed in greater than theoretical proportion, cooling the liquor after the reaction and substantially saturating it with ammonia, separating the precipitated hexamethylenetetramine on a filter and washing and drying the hexamethylenetetramine, passing the mother-liquor to a still and distilling off the ammonia to lower the solvent power of the liquor for ammonium chloride, cooling the contents of the still, separating the precipitated ammonium chloride on a filter and washing the ammonium chloride, and returning the solvent to a source of supply.

CARNIE B. CARTER.